United States Patent [19]
Potter

[11] Patent Number: 5,919,721
[45] Date of Patent: Jul. 6, 1999

[54] MICROFILTRATION OF ZEOLITES

[75] Inventor: Mark James Potter, Houston, Tex.

[73] Assignee: Exxon Chemical Patents Inc, Houston, Tex.

[21] Appl. No.: 08/450,440

[22] Filed: May 25, 1995

Related U.S. Application Data

[62] Division of application No. 08/273,584, Jul. 11, 1994, abandoned, which is a continuation of application No. 07/769,912, Sep. 30, 1991, abandoned.

[51] Int. Cl.$^6$ ................................................. B01J 29/06
[52] U.S. Cl. ............................. 502/64; 502/60; 502/66; 502/74
[58] Field of Search ............................ 502/60, 64, 74, 502/66

[56] References Cited

U.S. PATENT DOCUMENTS

| | | |
|---|---|---|
| 3,216,789 | 11/1965 | Breck et al. . |
| 3,867,512 | 2/1975 | Young . |
| 4,130,485 | 12/1978 | Dyer et al. . |
| 4,448,891 | 5/1984 | Cohen . |
| 4,545,539 | 10/1985 | Wortel . |
| 4,547,472 | 10/1985 | Van Nordstrand . |
| 4,552,856 | 11/1985 | Tauster et al. . |
| 4,593,133 | 6/1986 | Wortel . |
| 4,595,668 | 6/1986 | Poeppelmeier et al. . |
| 4,648,960 | 3/1987 | Poeppelmeier et al. . |
| 4,987,109 | 1/1991 | Kao et al. . |
| 5,074,989 | 12/1991 | Sigaud et al. . |
| 5,152,884 | 10/1992 | Kao et al. . |

FOREIGN PATENT DOCUMENTS

| | | |
|---|---|---|
| 0216711 | 4/1987 | European Pat. Off. . |
| 0219354 | 4/1987 | European Pat. Off. . |
| 0365314 | 4/1990 | European Pat. Off. . |
| 1356741 | 6/1974 | United Kingdom . |

OTHER PUBLICATIONS

Peters et al. *Plant Design And Economics for Chemical Engineers* 4$^{th}$ ed. 1991 pp. 543–548.

*Primary Examiner*—Michael Lewis
*Assistant Examiner*—Thomas G. Dunn, Jr.
*Attorney, Agent, or Firm*—Edward F. Sherer

[57] ABSTRACT

Processes for washing zeolites, preferably less than about 0.5 micron in size, with a microfiltration system employing a washing liquid, such as an aqueous solution or water (preferably deionized water), to produce zeolite crystals having a zeolite pH in the pH range of 9.4 to 10.0 are provided. The zeolite pH is determined by a special procedure. The preferred washing processes include slurring the zeolite crystals with water (or an appropriate wash solution), initially concentrating the slurry with a microfilter to a preselected initial concentration, washing the crystals by adding make-up water at the same rate as the fluid loss due to permeate flow until the permeate pH is below a preselected value, then stopping the make-up flow and concentrating the slurry to a preselected maximum final concentration. A sample of the zeolite is dried and tested for its pH and if within the desired range, the batch of maximally concentrated slurry is dried. These processes are employed to produce zeolite crystals having a zeolite pH of about 9.4 to 10.0.

21 Claims, 2 Drawing Sheets

5,919,721

MICROFILTRATION OF ZEOLITES

CROSS REFERENCE TO RELATED U.S. PATENT APPLICATIONS

This application is a divisional of pending application Ser. No. 08/273,584, filed Jul. 11, 1994 now amended which is a continuation of application Ser. No. 07/769,912, filed Sep. 30, 1991, now abandoned.

This invention is related to U.S. Pat. application No. 259,644 filed Oct. 19, 1988.

BACKGROUND OF THE INVENTION

The present invention is related to zeolite crystals, and more particularly, related to washing and recovering zeolite crystals, especially zeolite crystals less than about 0.5 microns in size.

Zeolite based catalysts are useful in catalytic reforming processes. Catalytic reforming is a major petroleum refining process used to raise the octane rating of naphthas ($C_6$ to $C_{11}$ hydrocarbons) for gasoline blending. Catalytic reforming is also a principal source of aromatic chemicals (benzene, toluene, and xylenes) via conversion of paraffins and naphthenes to aromatics. The principal chemical reactions which occur during catalytic reforming include dehydrogenation of cyclohexanes to aromatics, dehydrocyclization of paraffins to aromatics, dehydroisomerization of alkylcyclopentanes to aromatics, isomerization of normal paraffins to branched paraffins, dealkylation of alkylbenzenes and hydrocracking (or hydrogenolysis cracking) of paraffins to light hydrocarbons, i.e., methane, ethane, propane, and butane. The hydrocracking reaction is undesirable and should be minimized since it produces light hydrocarbons that are not suitable for gasoline blending and which are accordingly less valuable than fractions useable in gasoline.

Current reforming catalysts widely used in commercial reformers are platinum on an alumina substrate, and platinum plus a second promoting metal such as rhenium or iridium on alumina. These catalysts are bifunctional, i.e., the dehydrogenation reactions required in the reforming process are accomplished on the catalytic metal in the catalyst and the isomerization and cyclization reactions also required in reforming are accomplished on strong acid sites on the alumina catalyst support. Undesirable hydrocracking reactions which break down $C_{6+}$ paraffins to lower molecular weight hydrocarbons and reduce selectivity to aromatics also occur on the strong acid catalytic sites.

Alumina based reforming catalysts demonstrate reasonably high selectivities for converting $C_{8+}$ paraffins and naphthenes to aromatics but are less satisfactory for aromatizing $C_6$ to $C_8$ paraffins; they hydrocrack more of the lower paraffins to low value fuel gas than they convert to aromatics.

New reforming catalysts are being developed which are significantly more active and selective for aromatizing $C_6$ to $C_8$ paraffins than alumina based catalysts. These new catalysts are zeolite based rather than alumina based. Zeolite based reforming catalysts are more selective for aromatizing lower paraffins because they are monofunctional, i.e., they accomplish the isomerization and cyclization reactions on the same active catalytic metal sites on which the dehydrogenation reactions occur. To accomplish isomerization, they do not require nor contain strong acid sites which substantially eliminates hydrogenolysis cracking reactions.

In addition, certain zeolites employed to make such newer catalysts have micropore dimensions and physical configurations which sterically promote the desirable isomerization and dehydrocyclization reactions for $C_6$ to $C_8$ paraffins with adequate activity maintenance for commercial use and repress undesirable hydrogenolysis cracking reactions. Accordingly, selectivity of $C_6$ to $C_8$ paraffin conversion to aromatics is high for these sterically favored zeolite catalysts. Zeolites which perform best as reforming catalyst substrates fall into the so-called "large pore" category which have pore diameters of 6 angstrom units or higher. Large pore zeolites, such as zeolite L, are believed to be particularly good reforming catalyst substrates.

U.S. Pat. No. 4,448,891, to Cohen, teaches an improved reforming catalyst (employing a zeolite L support) made by continuously soaking the zeolite L (or using a series of soaks) in an alkali solution having a pH of at least 11 for a time and temperature effective to increase the period of time over which the catalytic activity of the catalyst is maintained, followed by conventional filtrate washing the alkali soaked zeolite with water (optionally followed by repeated soakings in the zeolite solution for additional periods with filtrate washing repeated after each soak) until the pH of the wash water coming off the zeolite filtrate is at or below 10.5, followed by drying at 110° C.

U.S. Pat. Nos. 4,544,539 and 4,593,133, both to Wortel, teach zeolite L having desired characteristics achieved by a specified process. These Wortel patents teach a preferred form of zeolite L for use as a substrate for reforming catalysts. As noted in Example 15, the solid zeolite product was separated by centrifuging, washed four times with cold water and dried at 150° C. for four hours. For this same example, the zeolite was in a cylindrical shape and 1.5 to 2.5 microns in size. For Example 17, the zeolite was in a cylindrical shape and 1 to 1.5 microns in size and for Example 1, 2 to 2.5 microns. The general teachings of these patents are for cylindrically shaped large crystallites with a mean diameter of at least 0.1 micron, with a mean diameter of at least 0.5 micron being preferred. Tables 3, 4, and 5 illustrate zeolite sizes for the patent's process and comparison processes; one comparison process (W of Table 3) provides zeolites of 0.1 to 0.2 micron in size.

U.S. Pat. No. 3,216,789, to Breck, teaches a process for producing synthetic zeolites which involves washing zeolite crystals, after the reactant mother liquor is filtered off, preferably with distilled water, until the effluent wash water, in equilibrium with the product, has a pH of between 9 and 12. The examples of this patent teach that the resulting zeolite crystals settled to the bottom of the crystallization jar leaving a clear supernatant of reactant mother liquor. This patent also discloses that as the zeolite crystals are washed, the exchangeable cation of the zeolite may be partially removed and is believed to be replaced by hydrogen cations. If the washing is discontinued when the pH of the effluent wash water is between about 10 and 11, then the ($K_2O$+$Na_2O$)$Al_2O_3$ molar ratio of the crystalline product is disclosed as being approximately 1.0. The patent also notes that excessive washing will result in a somewhat lower value for this ratio, while insufficient washing will leave a slight excess of exchangeable cations associated with the product. The zeolite crystals are then dried, conveniently in a vented oven.

The conventional zeolites produced by the processes of Wortel (and probably Breck) are large particle zeolites having a length of about 0.9 to about 1.3 microns and a diameter of about 1.0 to about 1.3 microns. Newer small sized zeolites now being produced have a length of about 0.4 to about 0.7 micron and a diameter of about 0.3 to about 0.5 micron, although some particles may be smaller than these lengths and/or diameters. These newer small particle zeolites produce reforming catalysts believed to have a better activity, selectivity and activity maintenance than other known zeolite-based reforming catalysts. Examples of such small sized zeolite based reforming catalysts are disclosed in European patent application publication number 0 219 354 of Verduijn. However, it is often difficult to prepare such catalysts because of the difficulty of recovering and washing small zeolite particles.

Microfiltration (or ultrafiltration) is well known and has been employed in water purification and beverage processing where solids in a solution are considered a contaminant to be removed and are present in small concentrations of less than about 10 wt %. That is, generally the solute is the product and the solids are to be removed and discarded. For example, water desalination employs ultrafiltration to remove dissolved salt ions from water.

However, microfiltration (or ultrafiltration) may also be used to concentrate and wash solids in liquid streams from the order of 1 wt % to about 10 wt % where solids are the products. In biotechnology, microfiltration is used for concentration and recovery of proteins and bacteria from dilute solutions. Microfiltration is employed for particles in a size range below about 1.0 micron.

U.K. Patent Application 1,356,741 discloses a method for concentration and purification of particulate biological materials, having a particle size greater than about 50 m$\mu$, from growth medium components with a filter having pore sizes in the 0.22 to 0.65 $\mu$ range. In two examples, the biological particulate matter is concentrated with one pore size filter (0.45 $\mu$) in a first thin-channel ultrafiltration module and then washed in a second thin-channel ultrafiltration module with a 0.22 $\mu$ pore filter. In the third example, the biological particulate was only concentrated in a thin-channel ultrafiltration module using a 0.65 $\mu$ pore filter. This patent teaches an initial concentration step employing one pore size ultrafilter followed by a washing step employing a different and smaller pore size ultrafilter.

U.S. Pat. No. 4,130,485 discloses a method for separating particulate solids (having a distribution in size of from about 0.1 to about 50 microns) from a solid/fluid dispersion (dye dispersion) via a solid, porous, tubular microfilter (such as sintered, stainless steel) with a pore size of between 0.5 to 5 microns. This patent teaches an initial washing step followed by a concentration (to about 11%, but no more than about 20% by weight) step. This patent employs a solid, 2 micron pore size, porous tubular member to wash and concentrate a mixture of a minor amount of primary particles and a predominant amount of flocculated particles of primary dye particles, with an average particle diameter in the slurry of about 3 microns and about 1% by weight dye particles. The volume of fluid is initially reduced by circulating slurry until a desired inlet pressure is obtained. Further an additional surfactant may be added to prevent any substantial pressure build-up during the concentration step.

The present invention employs microfiltration (or ultrafiltration) techniques to wash and recover zeolites crystals, especially zeolites less than about 0.5 microns in size, from crystalline mother liquor or other aqueous liquids to produce a superior catalyst substrate.

SUMMARY OF THE INVENTION

The present invention is directed primarily to processes for recovering zeolite crystals (especially zeolites less than about 0.5 micron in size) from their crystallization mother liquor and then washing and recovering zeolite crystals from a washing liquid, such as an aqueous solution or water (preferably deionized water), with a microfilter (or ultrafilter) to produce zeolite crystals having a zeolite pH in the pH range of 9.4 to 10.0, preferably 9.6 to 9.8. The zeolite pH of the zeolite crystals is determined using the following procedure: a mixture of 10 grams of zeolite and 100 grams of deionized water is stirred at room temperature for about five minutes and then centrifuged to provide a supernatant liquid free of solids and the zeolite pH is the pH of the supernatant liquid determined using a standard pH meter calibrated with pH 7 and 10 buffer solutions. Typically, zeolite crystals when recovered from the mother liquor in which they are crystallized, have a pH of about 12.5 (using the foregoing procedure), and they must be washed with neutral or acidic pH aqueous solutions to achieve a target zeolite pH range of between 9.4 to 10.0.

The presently preferred washing processes include slurring a batch zeolite crystals with water (or an appropriate acidic aqueous solution), preferably but optionally concentrating the slurry with a microfilter or ultrafilter, washing the crystals by adding make-up water (or acidic aqueous solution) at the same rate as the loss due to permeate flow through the filter until the permeate pH reaches a predetermined value (below about 11.0), stopping the make-up flow and concentrating the slurry to a preselected pressure limit of the filter. A sample of the zeolite batch may be taken and dried and then tested for its zeolite pH by the above-noted procedure and if between about 9.4 and about 10.0, the zeolite batch is accepted. Then the batch of zeolite crystals in the final concentrated slurry are dried in an appropriate manner, such as thermal drying. The dried zeolite crystals may then be used as a substrate for reforming catalysts.

It is a feature of the present invention to produce washed zeolite crystals capable of providing a reforming catalyst having superior activity, selectivity and activity maintenance.

Accordingly, these and other features and advantages of the present invention will become apparent from the following detailed description, wherein reference is made to the Figures in the accompanying drawings.

IN THE DRAWINGS

DETAILED DESCRIPTION

While the methods of the present invention apply advantageously to any large pore zeolite which is a suitable substrate for reforming catalysts, the following discussion is directed to small particle (less than about 0.5 micron in size) large pore zeolites, which are a particularly advantageous substrate for reforming catalysts. A complete description of large particle size zeolite L is provided in U.S. Pat. No. 3,216,789 and procedures for making zeolite L are described in U.S. Pat. Nos. 3,216,789 and 3,867,512, the disclosures of which are incorporated herein by reference. Small sized zeolites and procedures for making them are disclosed in European patent application publication number 0 219 354, the disclosure of which is incorporated herein by reference. Reforming catalysts made using zeolites which have been washed with aqueous solutions or water such that the zeolite after washing exhibits a zeolite pH in the pH range of 9.4 to 10.0 (by the special testing procedure noted below), and preferably 9.6 to 9.8, may be converted to reforming catalysts which exhibit superior performance, as noted in the related U.S. Pat. application.

For purposes of the present invention, the zeolite (or cake) pH of the zeolite crystals is determined using the following procedure, which is disclosed in the related U.S. Pat. application: a mixture of 10 grams of zeolite and 100 grams of deionized water is stirred at room temperature for about five minutes and then centrifuged to provide a supernatant liquid free of solids. The term "zeolite pH" or "cake pH," as used herein, is the pH of the supernatant liquid determined using a standard pH meter calibrated with pH 7 and 10 buffer solutions.

Figure 1:
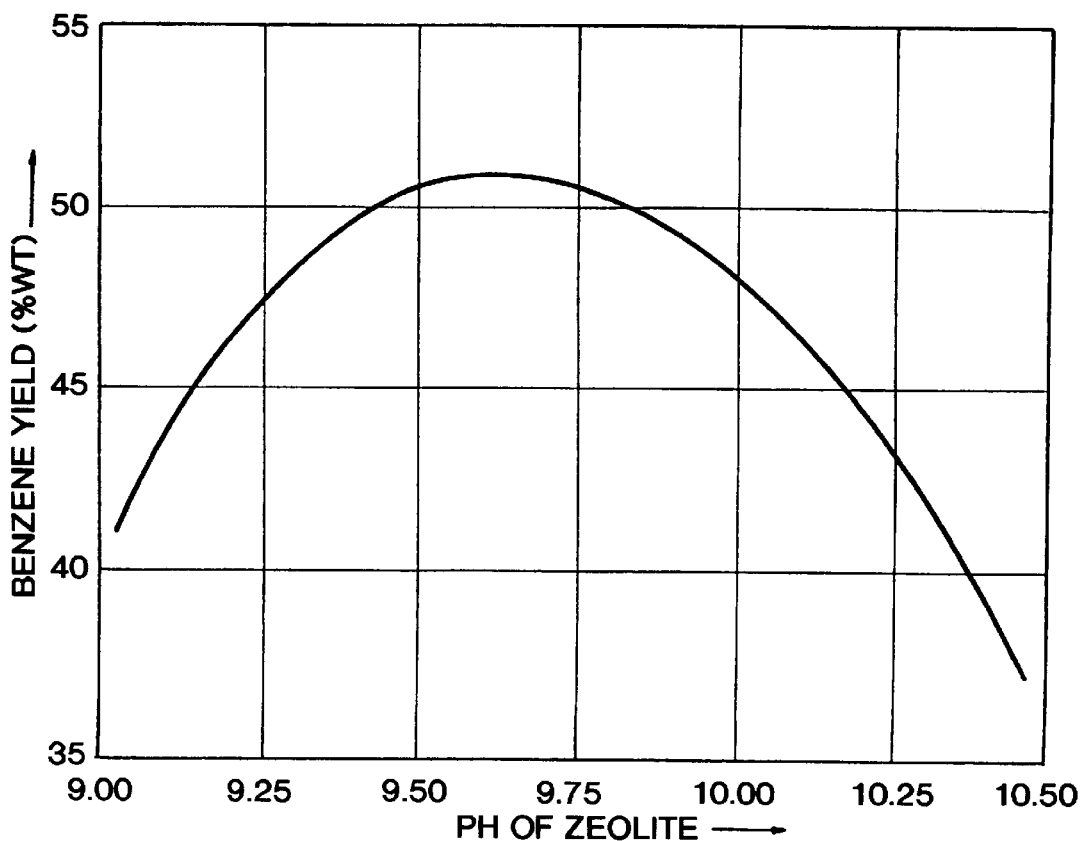
FIG. 1 depicts reforming catalyst performance versus the zeolite pH of zeolite used to make the catalyst.

As noted in the related application, which is incorporated by reference, the advantage of washing the zeolite to achieve the target zeolite pH is shown in FIG. 1, in which reforming catalyst performance as measured by a standard catalyst activity test is plotted against the pH of zeolite L (measured by the foregoing procedure) used to make the catalyst. Catalysts made with zeolite washed to a zeolite pH, as defined above, with the pH in the range of 9.4 to 10.0, and preferably in the 9.6 to 9.8 pH range, exhibit superior reforming catalytic activity.

As an additional characteristic, if the catalyst is loaded with the noble metal by, for example, an ion-exchange technique, it is desirable that the type L zeolite chosen as the support have, prior to being loaded with the noble metal, a pH between 9 and 11.5 as determined by the following method: A 2.5 g sample of zeolite is equilibrated at ambient temperature with 70 cc of distilled water and the pH of the slurry is determined.

Conventional large size zeolites (such as those taught by Wortel) usually settle out of their mother liquor after at most a few hours, but small size zeolites may or may not settle out of their mother liquor. If settling occurs, any supernatant mother liquor is decanted and the zeolite particles are slurried in an aqueous solution. This reduces the amount of washing required in subsequent washing steps. Conventional methods for washing and recovering large particle size (greater than about 1 micron in size) zeolites from an aqueous slurry employ some sort of cake producing filtration process such as, but not limited to, centrifugation, pressure filtration, vacuum filtration, and belt filtration. However, these conventional methods are not suitable for small particle zeolites.

The only technique found to work for small size zeolites is a microfiltration technique. Large size zeolites may be recovered and washed using either microfiltration or conventional techniques (that involve building a filter cake on a filtration surface), but microfiltration has advantages for large size zeolites as well. As one example, conventional large size (1.0–1.3 microns) zeolites may be pressure filtered. In such a conventional technique, pressure filtration, a zeolite slurry is added to a pressure filter and allowed to partially settle and form a cake on 3–5 microns pore size polypropylene filter cloths placed on porous plate of the pressure filter. Wash water is added continuously at a fixed flow rate and flows through the cake. The washing temporarily stops for taking a cake sample and analyzing it for its zeolite pH. The pH of the zeolite is periodically monitored and when below a preselected pH the washing is stopped. The wash is complete when the cake pH is in the 9.4 to 10.0 range.

Typically, pressure filters are designed to withstand a maximum pressure drop across the filter surface of about 75 psig but are maintained at about 20 to about 40 psig to stay well below the mechanical limit of the filter. The volume of wash fluid required to achieve the target pH varies from about 4 to 10 gallons of wash water per pound of dry zeolite, due to batch-to-batch variabilities and cake channelling. Typical recoveries are about 85 wt % of the theoretical zeolite yield from the crystallization process. However, for smaller particle zeolites, notably small particle size zeolite L (below about 0.5 micron in size), these conventional filtration methods become impossible due to the very high pressure drops across the cake; that is, the pressure required to force water through the cake is so high as to preclude any washing or so high as to form channels or cracks in the cake, so that most of the cake does not have the desired pH.

The well known Ergun equation explains this high pressure drop phenomenon and is as follows:

$$\Delta P = \frac{150 L G_o \mu (1-\epsilon)^2}{\phi_s^2 g_c D_p^2 \rho \epsilon^3},$$

where L is the depth of the bed, $G_O$ is the superficial mass flux, $\mu$ is the fluid viscosity, $\epsilon$ is the bed porosity, $\phi$ is the particle sphericity, $g_c$ is acceleration due to gravity, $D_p$ is the effective particle diameter, and $\rho$ is the fluid density. This equation states, in part, that the pressure drop across a bed of solids is proportional to filtrate flow, filtrate viscosity (thus, hot water is often used to reduce viscosity), cake thickness, and cake resistance. Cake resistance is inversely proportional to the square of the effective particle diameter, $D_p$, and proportional to the term $(1-\epsilon)/\epsilon^3$, where $\epsilon$ is the porosity of the cake. Thus, the pressure drop across a bed of 0.3 micron diameter solids will be at least 16 times that of a pressure drop across a bed of 1.2 microns diameter solids, due to the change in $D_p$, assuming all other properties are equal. Further, since these smaller sized zeolite particles are more compressible, the void volume (related to bed porosity, $\epsilon$) also decreases, resulting in even more increased pressure drops. Accordingly, conventional filtration processes become impossible or impractical because of these large pressure drops across beds of small particles, such as small particle size zeolites.

In accordance with the present invention, therefore, uniform washing of zeolite crystals with an aqueous liquid is accomplished with a microfilter as described below. Microfiltration (or ultrafiltration, which differs basically only in using a smaller filter pore size to recover smaller particles) is different from other known techniques for recovering and washing solids (such as pressure filtration or centrifugation filtration) in that the process does not form a cake of solids against a filter media, as is shown in FIG. 2.

Figure 2:
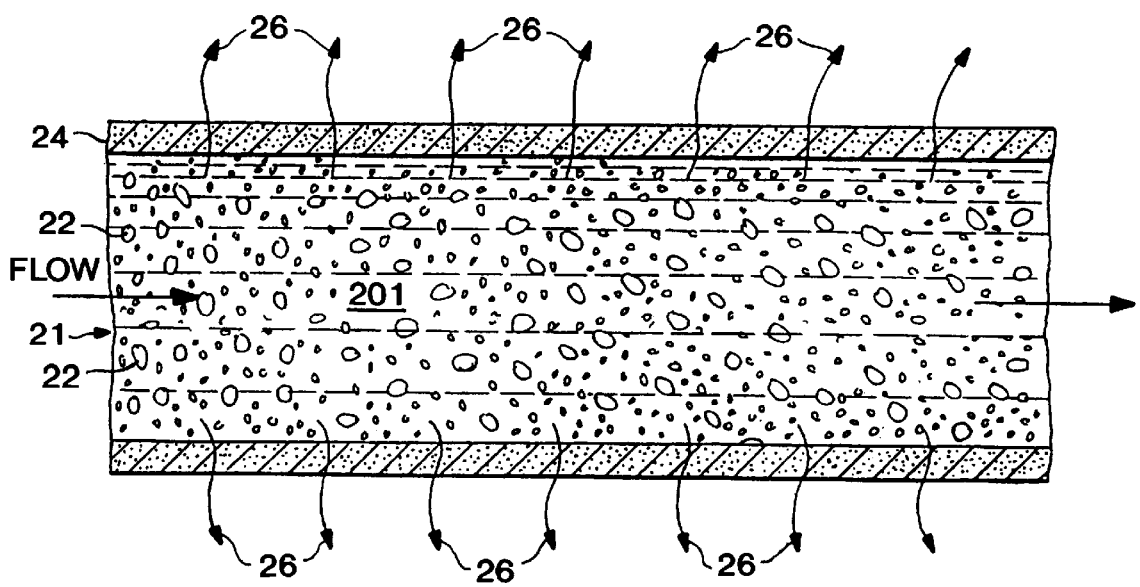
FIG. 2 depicts generally the filtration process for a microfilter.

FIG. 2 depicts generally the filtration process in a microfilter fiber for a zeolite slurry. More particularly, a slurry 20 of an aqueous liquid 21 and zeolite crystals 22 is depicted flowing through a microfilter 24. The walls of the microfilter 24 are porous and some of the aqueous liquid passes through the walls, as depicted by the arrows 26, while the zeolite 22 is retained inside the microfilter 24. The pore size of the filter media is selected to retain the desired size of particles (i.e., particles whose size is about the same as or slightly smaller than the pore size) from passing through or permeating the filter membrane while allowing solute and other small sized particles (much smaller than the pore size) to pass through the membrane. High mass flux rates parallel to the surface of the membrane prevent a build-up of zeolite crystals from occurring on the surface of the filtration media.

The key distinction of the present invention is employing microfiltration techniques to recover zeolite crystals at the desired zeolite pH of 9.4 to 10.0. However, the application of microfiltration to washing and recovering zeolites is different from traditional applications of microfiltration. In traditional applications, the product is a small amount of treated fluid with small amounts of particles removed therefrom. This invention differs from conventional microfiltration or ultrafiltration methods because of the high solids loading ultimately used (from 40 wt % to 60 wt %) and the emphasis on the washing of and retention of a crystalline product rather than a fluid. That is, the present invention treats large amounts of fluid containing a large amount of solids and retains the solids as a product.

In accordance with the present invention the zeolite crystals are washed with an aqueous washing fluid until the desired zeolite pH range is achieved. Permeate pH may be monitored to provide a very rough indication of zeolite pH. The washing liquid is preferably made with deionized water to insure that no contaminants are added to the zeolite which could later impair performance of any catalysts produced with such zeolite. Alternatively, the washing fluid may contain salts or bases of the principal exchangeable cations in the zeolite to reduce ion exchange replacement of zeolite cations with hydrogen ions in the wash water.

Figure 3:
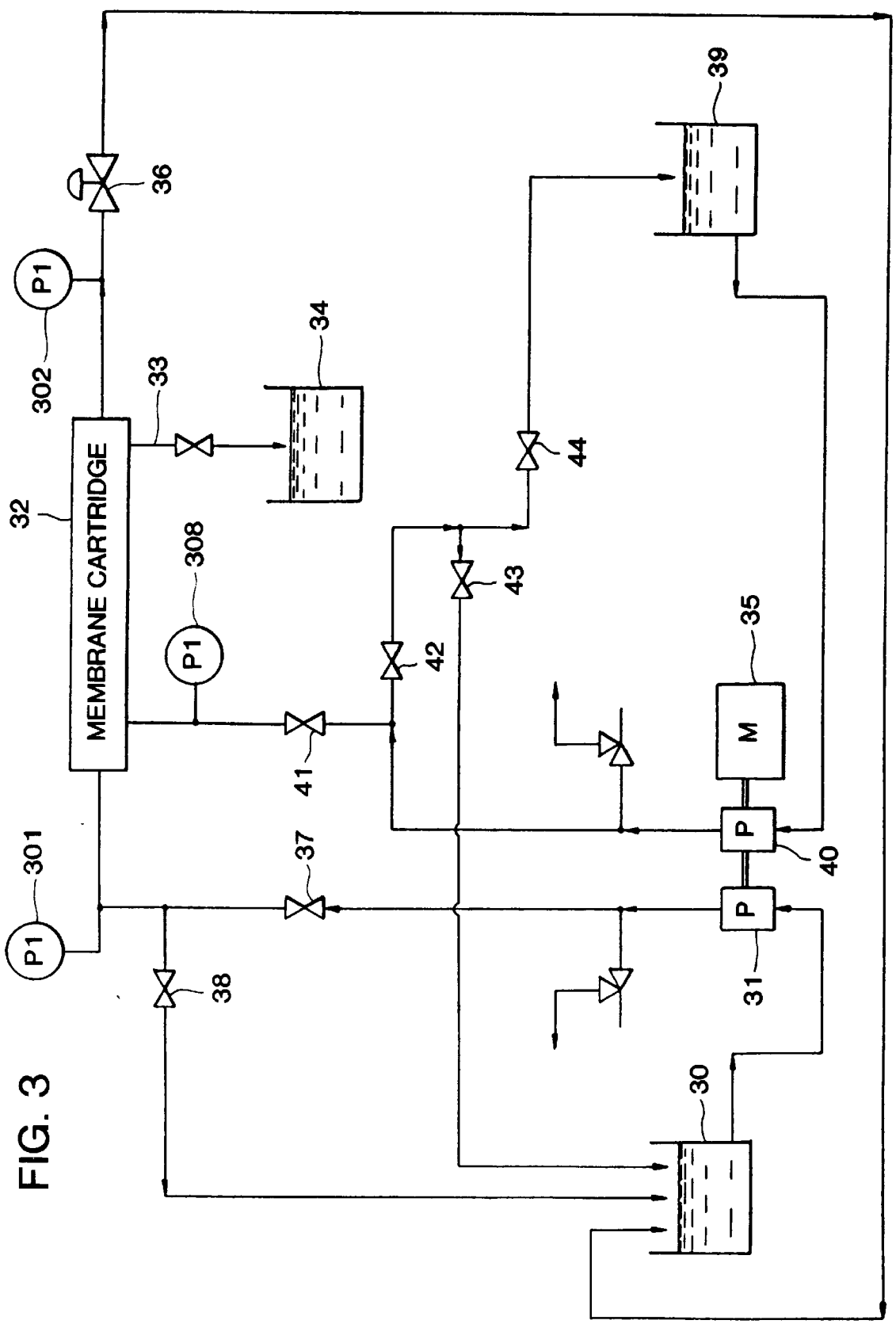
FIG. 3 depicts a block diagram of a microfiltration system suitable for practicing the methods of the present invention.

A block diagram of a microfiltration system suitable for practicing the processes of the present invention is shown in FIG. 3. As described below, the system has two fluid loops, one for circulating the zeolite slurry through a microfilter (or ultrafilter) and one for make-up or backflush water. Typically flow rates for conventional microfiltration are about 250 L/min per $m^2$ of tube cross-section, using 1 mm diameter hollow filter tubes. However, because zeolite slurries are very viscous, slurry feed rates are limited to between about 10 to about 60 L/min per/$m^2$ of tube cross-sectional area (preferably about 25 L/min per $m^2$) to avoid overpressuring the hollow filter tubes near their inlets. The slurry passes from a slurry feed tank 30 to a pump 31 and then through the filter 32 after which it is recirculated back to the slurry feed tank 30. At very low slurry feed rates the required minimum pressure difference (usually about 20 psig) across the wall of the hollow fiber (to force fluid from the slurry out the filter element's pore openings) should be maintained near the outlet of the hollow tubes while the pressure difference across the tube walls near their inlets should be limited to avoid tube damage (usually about 40 psig or less). The minimum pressure drop across the filter tube walls or pores is currently usually about 20 psig for nonmetallic and nonceramic microfilters. The highest slurry feed rate is determined by the mechanical integrity of the filter; that is, the inlet portion of the filter tubes must be able to mechanically withstand the high pressure associated with high feed rates without partial or complete physical disintegration due to excessive pressure drop across the walls of the hollow fiber at the inlet end.

Filter media may be made out of a variety of materials including, but not limited to, polymers (such as cellulose acetate), sintered metal, or ceramics. For a laboratory test, described later herein, a hollow fiber cartridge of polysulfone media was used. Other than hollow fibers, geometries such as flat sheets, spiral wound sheets, or tubes are also available and may be employed in accordance with the teachings of the present invention.

The pore size is selected to prevent virtually all particles larger than a desired size from passing through or permeating the filter media. The pore size is based upon the zeolite crystal's size and is preselected to retain the smallest desired crystals. The material which passes through the filter media pores comprises the permeate stream 33; this permeate stream 33 is analogous to a filtrate stream in a pressure filtration process and is collected in a container 34. The pressure (measured by pressure indicator 301) maintained on a fluid injected into the filter cartridge 32 supplies the pressure drop needed to force some of the solute (water or aqueous fluid) and contaminants (primarily colloidal silicates having a basic pH) through the filter media's pores on each pass. Usually, a fluid circulating pump 31 and motor 35 provide this positive pressure and the outside of the filter cartridge 32 is at ambient pressure and is connected to a means for collecting permeate 34. Alternatively, the outside of the filter may be placed under a vacuum or exposed to a pressure above atmospheric pressure.

A filter cartridge 32 is usually made up of a bundle of filter fibers (such as depicted in FIG. 2) whose porous walls serve as the filter media. Slurry is injected into one end of the fibers and removed from the other end. A container, which is part of the cartridge 32, around the tubes collects permeate passing through the walls of the fibers. The microfiltration cartridge 32 is similar in construction and appearance to a conventional single-pass shell and tube heat exchanger. The pressure across the porous walls of the fibers must be high enough to force permeate through the pores but not so high as to over pressure and distort or tear the walls of the fibers.

The pressure in the hollow fibers may be controlled by a pressure control valve 36 at the discharge end of the cartridge 32 and measured by pressure indicator 302. The pressure drop in the fibers along the length of the fibers depends on the flow rate (and increases with increasing flows) and may be adjusted by a flow control valve 37 on the inlet to the cartridge. In addition, valve 38 may be employed to partially recirculate slurry to the slurry tank 30; for this case, valves 37 and 38 control the flow rate entering the cartridge 32. These two pressure drops are interrelated and, for a given system cartridge or system, adjustment of one may require appropriate adjustment of the other by varying the slurry flow rate and outlet back pressure.

It is possible during microfiltration (or ultrafiltration) for a high concentration of solids to congregate near the surface of the filter media thus reducing permeate flow, or, for a constant flow rate, increasing the pressure drop across the wall of the hollow fiber. This is known as "concentration polarization". When this occurs, the filter media is backflushed with water to reduce the concentration of solids near the inside wall of the hollow fiber. Back-flushing is done using the back-wash water in container 39, via pump 40 and valve 41, as shown in FIG. 3 to clean this inside wall. It is often desirable to maintain a constant concentration of slurry in the slurry feed tank 30 thus requiring a source of make-up water from container 39, via pump 40 and valves 42 and 43, to replace any fluid lost from the slurry via the permeate stream 33. Thus, the back-wash loop is also used to provide make-up water and any make-up water is preferably heated.

The detailed batch process for washing and recovery of a zeolite slurry by microfiltration (or ultrafiltration) in accordance with the teachings of the present invention is as follows:

1. A batch of zeolite crystals conventionally recovered from the mother liquor are slurried in an aqueous liquid or water. Alternatively the mother liquor and crystals may be used as the initial slurry (or further diluted with an aqueous liquid or water), if the crystals will not precipitate out of the mother liquor. For the small size zeolites, the crystals may not (and usually do not) settle out of the mother liquid.
2. Although optional, preferably, the slurry is initially concentrated to approximately 30 wt % solids by microfiltering without adding any make-up aqueous solution or water to the slurry. This initial concentration step reduces the amount of wash water needed in subsequent steps by removing silicates which have a basic pH at a relatively high concentration without increasing the solids content to too great a level. An initial slurry flow rate of about 10 to 60 (or more) L/min per $m^2$ of cross-sectional entry area of the filter cartridge and preferably about 20–30 L/min per $m^2$ may be established. This flow rate is reduced with time to maintain an acceptable pressure drop across the microfilter's walls at the inlet and outlet of the hollow fibers as the slurry concentrates. The initial concentration step is stopped when the pressure exceeds a preselected maximum pressure allowed across the filter media, such as for example, 15 psig across the wall for a particular filter unit that has a maximum pressure limitation of 20 psig. The maximum across-the-wall pressure is an operating characteristic of a particular filter and is determined by the manufacturer of the filter cartridge; thus, the slurry is concentrated to some maximum concentration functionally related to the operating characteristics of the filter. The filter then may be back flushed with a minimum amount of water or aqueous fluid to remove any concentration polarization and then, optionally, the concentration continued. Any number of such back flushing steps may be employed during the initial concentration step. A final back flush may be performed after the final, initial concentration step is completed.

3. Once the concentration step is completed, a make-up fluid flow is started that matches permeate flow through the microfilter. This is the washing step of the process. During washing, the salt concentration in the slurry may decline to as low as about 15 wt % (or less), as silicates are removed and desired zeolites are retained. As the amount of basic salts in solution decreases, the viscosity decreases. Accordingly pressure in the hollow fibers may be reduced without reducing the permeate flow rate, or preferably, the feed rate is gradually increased to maintain a preselected pressure across the filter walls as silicates are removed, such as for example about 10 psig for a filter unit with a maximum pressure limitation of 20 psig. As permeate flow rate increases, the makeup fluid feed rate is increased.

Alternatively, "washing" of the zeolite crystals may be accomplished by repeating the concentration step followed by a back flushing step a sufficient number of times to achieve the target zeolite pH.

4. When the pH of the zeolite from a wash or concentration is believed to have reached a target range (9.4–10.0), the make-up water flow is stopped and the slurry is concentrated to a final concentration. The zeolite pH has to be determined by testing the zeolite (by the procedure described herein) to make sure it is in the required pH range (9.4–10.0). The permeate pH may be monitored but it is not an accurate indicator of zeolite pH. The final concentration based upon the across-the-wall pressure limit of the filter unit; this is typically about 40 to 60 wt % slurry concentration for current non-metallic or non-ceramic cartridges. That is, the filter is run at its maximum across-the-wall pressure until no more permeate is discharged and the wash or concentration step is then stopped. Again, this maximum concentration is functionally related to an operating characteristic of the filter. However, higher solids contents may be achievable with different microfiltration equipment and microfilters. The final solids concentration will be determined by the mechanical strength (maximum pressure limit across the wall) of the filter used and the slurry components.

In general, the higher the temperature of the water or aqueous solution, the lower the viscosity of the slurry mixture. This means permeate flow rate is higher at any given pressure differential across the hollow fibers or alternatively, pressure may be reduced while maintaining a constant permeate flow rate. Higher final slurry concentrations are achieved at higher temperatures, but the slurry temperature should be maintained below its boiling point.

5. If necessary, the maximally concentrated (to a final concentration) slurry is then conventionally dried to remove residual water or fluids, such as by thermal drying.

6. The zeolite resulting from the final drying step is tested to confirm its pH is within the range of 9.4 to 10.0 and end the wash process; if the zeolite pH is above the range, it must be reslurried and rewashed as described above. During washing, the permeate pH may be monitored as a rough indicator of zeolite pH. The process is a batch process for a particular batch of zeolite.

7. If it is desired to introduce an additional cation (as described later herein) into the zeolite, a salt of that cation may be added to the slurry solution and ion exchange accomplished simultaneously with washing. Alternatively, another convenient point in the processing sequence to accomplish the ion exchange is immediately after the zeolite is washed to the target permeate pH and before the final concentration step. Also, a salt of the existing exchangeable zeolite cation may be added to the wash solution to preclude hydrogen ions from water ion exchanging into the zeolite.

For a commercial process the volumes/areas/pore size of microfilter, flow rates, and temperatures all are appropriately selected based upon the desired unit capacity, slurry properties and equipment specifications. The maximum allowable pressure for the cartridge is determined by the cartridge manufacturer. A parallel bank of cartridges may be employed to increase the volume of fluid to be filtered. A suitable slurry recirculating pump is selected, as is a flow controller and "wall" or back pressure pressure regulator. This system also requires a means for back flushing, permeate removal, and slurry transfer to and from the system, as well as a slurry drying means. A typical system is depicted in FIG. 3. Further, appropriate process instrumentation and controls may be included to automate the process.

The above procedure produces zeolite having a pH (tested by the procedure described herein) of preferably 9.4 to 10.0. While tested on small particle (0.3–0.5 microns) zeolite L (for which this invention is the only viable wash method), this invention is also applicable to large particle zeolites for which there are other conventional washing methods. With proper equipment selection, this invention may also be applied to larger (greater than one micron) size zeolites as well. For example, 0.5 to 1 micron pore size microfilters may be employed to wash and recover large size zeolites.

Conventionally, the large particle zeolite crystals may be washed by separating them from the mother liquid using a pressure leaf filter (such as a Funda filter), and then pumping freshly supplied aqueous liquid, such as deionized water, through the zeolite filter cake until the pH of the zeolite reaches the prescribed pH range, as described in more detail earlier herein. With all conventional washing processes, care must be taken to ensure that the zeolite crystals are uniformly washed to avoid variability in the resulting catalyst. This usually requires uniform deposition of a cake of zeolite across a filter surface and that all portions of the filter surface have equal exposure to wash fluid flow. Thus, it is particularly important to insure that the zeolite crystals are uniformly deposited across the filter surface to avoid maldistribution of wash water flow through the zeolite crystals so that all segments of the batch are washed uniformly.

Typically, about 4 gallons of wash water, or more, per pound of zeolite are pumped through a conventional pressure filter (such as a Funda filter) to reduce the zeolite pH to the target range (9.4–10.0). Thus, one advantage of washing by microfiltration is that less washing water (typically 2 gallons wash water per pound of dry zeolite) is required than is typical of pressure filtration (at least approximately 4–5 gallons per pound). This is believed due to the intimate nature of washing in the microfilter which occurs in suspension and not when the particles have formed a cake.

The washing process of the present invention is particularly directed to washing small particle, large pore zeolite, preferably zeolite L, for use as a substrate for hydrocarbon reforming catalysts. Representative examples of preparing small particle type L zeolites suitable for purposes of the present invention are described in European patent application, publication number 0 219 354, and large size type L zeolites are described in U.S. Pat. Nos. 3,216,789 and 3,867,512, the disclosures of which are incorporated herein by reference.

As previously mentioned, type L zeolite may provide a better catalyst support or base material for a hydrocarbon reforming catalyst than conventional platinum and rhenium alumina catalysts. Small size type L zeolites are believed to be preferred over large size zeolites. As used herein, the term "zeolite" refers to a group of naturally occurring, hydrated, metal aluminosilicates, which are crystalline in structure in addition to synthetic zeolite having a composition similar to certain of the natural crystalline zeolites. For purposes of the present invention, the term "zeolite L" and "type L zeolite" are used interchangeably and refer to synthetic zeolite. By way of further explanation, type L zeolites are synthetic zeolites which crystallize in the hexagonal system with a characteristic X-ray diffraction spectrum, i.e., a characteristic X-ray diffraction pattern obtained from CuK alpha radiation with the major d(angstrom) peak values set out in Table A, below.

TABLE A

| | | |
|---|---|---|
| 16.10 ± 0.3 | 3.91 ± 0.02 | 2.91 ± 0.01 |
| 7.52 ± 0.04 | 3.47 ± 0.02 | 2.65 ± 0.01 |
| 6.00 ± 0.04 | 3 28 ± 0.02 | 2.46 ± 0.01 |
| 4.57 ± 0.04 | 3.17 ± 0.01 | 2.42 ± 0.01 |
| 4.35 ± 0.04 | 3.07 ± 0.01 | 2.19 ± 0.01 |

A theoretical formula is 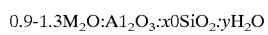$Mg/n[(AlO_2)_9(SiO_2)_{27}]$. The real formula, however, may vary by, for example, the ratio of silicon to aluminum varying from 2.5 to 3.5. A general formula for zeolite L may be represented as follows:

$$0.9\text{-}1.3 M_2O : Al_2O_3 : x0SiO_2 : yH_2O$$

wherein "M" designates at least one exchangeable cation; "n" represents the valence of "M"; and "y" may be any value from 0 to about 9, and "x" is any value between 5.01 and 7.0 and preferably between 5.2 and 6.9.

Physically, zeolite-L has undulating, channel-shaped pores varying from about 7 to 13 angstroms in diameter and may occur in the form of cylindrical crystals and for large particle sizes may have a mean diameter of at least 0.5 micron and a length to diameter ratio of at least 0.5. The above notwithstanding, minor variations in the mole ratios of the oxides within the ranges indicated by the above formulas do not significantly change the crystal structure or physical properties of the zeolite.

Zeolite L can only be synthesized in the potassium form, i.e., in a form in which exchangeable cations present are substantially all potassium ions. But the cations are exchangeable so that zeolites may be formulated to contain a number of cations such as mono-, di- and trivalent metal ions, particularly those of Groups I, II and III of the Periodic Table including barium, calcium, cesium, lithium, magnesium, potassium, sodium, strontium and zinc ions and the like, in addition to other cations, for example, hydrogen and ammonium ions. For example, a type L zeolite in a potassium form can be ion exchanged by treatment with an aqueous solution containing a rubidium and/or cesium salt, after which the zeolite is washed to eliminate excess ions. The percent of ions exchanged can be increased by repeating the ion exchange treatment of the zeolite. Such ion exchange processes are taught in U.S. Pat. No. 3,216,789 to Breck, the disclosure of which is incorporated herein by reference.

Inasmuch as crystallized, zeolite particles are extremely fine in size, typically about one micron or less, they are difficult to contain in a fixed bed reactor and as noted hereinbefore would induce extremely high pressure drops. The zeolite crystals, therefore, are preferably formed into aggregates, such as extrudates, tablets, pills or spherical forms, typically, in the 1/32 to 1/4 inch size range, to be suitable for use in commercial fixed bed reactors. An inorganic binder, such as alumina, silica, kaolin or an alumina-silicate is required to hold the aggregate together and provide crush strength and attrition resistance. Methods for forming zeolite L aggregates are disclosed in U.S. Pat. Nos. 4,595,668 and 4,648,960, the disclosures of which are incorporated herein by reference.

To complete the production of the zeolite based reforming catalyst one or more catalytically active metals must be dispersed into the zeolite. These metals are typically Group VIII metals which include platinum, rhenium and iridium. Other metals can be added to promote the activity and stability of the catalyst. These include tin, iron, germanium and tungsten. Platinum can be introduced by impregnating either the zeolite crystals prior to forming the aggregates or the aggregate zeolite particles with an aqueous solution of a platinum salt or complex such as chloroplatinous acid, hexachloroplatinic acid, dinitrodiaminoplatinum or platinum tetraamine dichloride. Alternatively, platinum can be introduced by ion exchange with potassium ions in zeolite L using a salt such as platinum tetraamine dichloride. Similar compounds can be used to introduce other metals such as rhenium and iridium into the zeolite catalyst. Superior catalysts are obtained when at least 90% of the metals added to the catalyst prior to reduction are less than 7 angstrom units in size.

Conventional techniques used to manufacture catalysts are disclosed in U.S. Pat. Nos. 4,595,668 and 4,648,960, both of which are incorporated herein by reference. Catalysts of platinum-potassium type L-zeolite have been disclosed in U.S. Pat. No. 4,552,856, to Tauster et al., the disclosure of which is incorporated herein by reference. A preferred method for making small sized zeolite L based catalyst is disclosed in European Patent application publication number 0 219 354, which is incorporated herein by reference.

The following discussion illustrates the methods of the present invention for potassium zeolite L. However, the methods of the present invention may be employed for other zeolites.

The washing process of the present invention begins after the zeolite crystallization is complete. Zeolite L is crystallized out of a gel containing potassium hydroxide, silica, alumina and water. (Potassium is required in the gel because zeolite L crystallizes only in the potassium form, e.g., the exchangeable cations in the zeolite are potassium.) The residual zeolite and crystallization mother liquor are basic, typically in the 12 to 13 pH range. The small sized zeolites may not settle out of the mother liquor. As much supernatant mother liquor is drained or pumped out of the crystallizer as possible and the zeolite is reslurried in water, preferably deionized water. The resulting zeolite slurry is then pumped into a microfiltration system and washed in accordance with the teachings of the present invention.

As noted before, microfiltration (and ultrafiltration), is different from conventional pressure and centrifugation filtration in that the process does not form a cake of solids against a filter media. The pore size of the media is preselected to prevent the desired zeolite particles from permeating the membrane while allowing solute and smaller sized particles, such as colloidal silicates having a basic pH, to pass through. The capacity of the filter cartridge depends upon the number, size and length of filter fibers employed in the cartridge which is determined by the manufacturer and slurry characteristics. The slurry batch volume and characteristics of the slurry components determine the volume and type of and numbers of cartridges to be employed in a system, as well as the overall system design. Several such cartridges may be employed in series, parallel, or some combination depending upon the characteristics of the overall system and operating duties. Usually the linear velocity of the slurry through the hollow fibers needs to be kept above a minimum to prevent solids build-up on the inner walls, i.e. "concentration polarization".

The following examples serve to illustrate one embodiment of the present invention and the inadequate performance of several prior art techniques for washing and recovering small size zeolites. They are provided to generally illustrate the methods of the present invention, but are not intended to limit the scope of the invention.

EXAMPLE 1

A laboratory demonstration of the process of the present invention has been performed, and in general, a diagram of the microfiltration system employed is shown in FIG. 3. The system had two fluid loops, one for the zeolite slurry and one for make-up or backwash water. The pump was a Masterflex with two size 17 heads, the "tanks" were 2 to 5 liter glass beakers, and the microfilter membrane cartridge was a Cole Parmer hollow fiber (0.75 mm id) filter cartridge (13¼" long ×⅜" diameter) with polysulfone media having a 0.1 micron pore size and a membrane (porous wall) area of about 100 cm$^2$. The slurry was supplied at high mass velocity (about 26 L/min/m$^2$) to the filter cartridge and then recirculated back to the slurry feed tank. The permeate pH was measured with a standard laboratory pH meter.

The specific, continuous process for washing and recovery of a batch of zeolite slurry by microfiltration was, after several startup-runs needed to adapt microfiltration techniques to zeolites, as follows:

1. 1000 ml of slurry containing about 0.3 micron particle size zeolite L crystals with an initial concentration of 21 wt % solids (15 wt % zeolite) and a slurry pH of 12.13 was placed in the microfiltration system's slurry feed tank. The slurry was then circulated and concentrated to approximately 30 wt % solids by microfiltering without adding make-up water to the slurry. That is, the slurry was circulated through the microfilter by the pump with no makeup water being added to the slurry feed tank. The concentration step was stopped when the wall pressure exceeded 15 psig (as the Cole Parmer filter unit has a maximum pressure limitation across the filter pores of about 25 psig). The filter was then backflushed once with a small amount of water and the concentration step continued. The initial slurry flow rate was 26.4 L/min/m$^2$. This flow rate was adjusted downwardly with time to maintain an acceptable pressure drop of about 10 psig as the slurry concentrated. A final backflush with a small amount of water was performed after the concentration step was stopped.

2. After concentration, a make-up water flow was begun that matched make-up flow with fluid loss from permeate flow; this is the washing step of the process. As the silicates were removed, the salts content of the slurry fell and so did the wall pressure. The feed rate was gradually increased to maintain a pressure of about 10 psig.

3. When the pH of the permeate reached a target value, of about 11, the make-up water flow was stopped and the slurry was concentrated to the wall pressure limit of the filter unit, about 40 wt % (specifically 42 wt % solids) for the selected filter cartridge. The concentrated slurry was removed from the slurry feed tank and placed into a vacuum filtration vessel.

4. The concentrated slurry was dewatered by vacuum filtration on a 0.1 micron polypropylene membrane at ambient temperature and dried overnight at 110° C., and produced a zeolite pH 10.15, which is very close to the target range of 9.4 to 10.0.

Detailed data for this example are shown in Table B, and the material balances for this example are shown in Table C. Permeate samples were periodically analyzed by an inductively coupled plasma emission spectrometery (ICPES) for aluminum and silicon. The aluminum was used to detect the presence of zeolite in the permeate, i.e. leakage of zeolites through the filter's pores; none was detected. A sample of permeate "spiked" with slurry showed significant aluminum levels (>10,000 ppm). The silicon was used to measure the amount of colloidal silicates in the permeate and decreased as the permeate pH decreased.

EXAMPLE 2

A laboratory demonstration of a conventional pressure filtration process for a small sized (0.3–0.5 micron) zeolite was performed. A simulation of a pressure type filtration process was evaluated using a single pressure filter. Solids loading, cake thicknesses, and wash water rates were scaled down from typical pressure filtration values. A small pore size filter cloth (1 micron) was used to recover small sized zeolites. This one micron pore size is capable of recovering the small particle zeolites via bridging of the holes by several of these particles. The pressure drop across the cake was very large (90 psig), before the filtrate flow rate was decreased to filtrate rates one-half to one-quarter of those useable for large particle zeolites; the pressure for large particle zeolites is typically less than 10 psig at these same filtrate rates. However, the runs were terminated early because of these large pressure drops. These results confirm the predictions of the Ergun equation about the impracticality of conventional filtration techniques for small size zeolites.

In order to overcome these large pressure drops, two modifications were tried. The first was to flocculate the zeolite with a long organic polymer. This should cause the zeolite to settle into a more porous cake.

A number of flocculants were tried with vacuum filtration being used to test the flocculants; in vacuum filtrations, a decrease in filtration time at a constant pressure would be indicative of a decrease in pressure drop at a constant filtration rate (i.e., useful in pressure filtration). A maximum reduction of about 35% in filtration time was observed. To be viable in pressure filtration a reduction of 80–90% would be needed. Pressure filtration with one promising flocculent did not significantly change the pressure curve when no flocculent was added to a small particle zeolite.

Next, organic coagulants, such as methanol, acetone and MEK were tried to coagulate the slurry prior to filtration. Although many effectively coagulated the slurry, none reduced the vacuum filtration times enough to be considered viable. Then, polymeric organic coagulants were tried; one reduced the filtration time by about 65% at high doses ($\approx$1000 ppm) but not enough of a reduction to be viable.

EXAMPLE 3

In conventional belt filtration a thin layer of slurry is placed upon a belt of filter media and a vacuum is drawn from behind the belt. After dewatering, the cake is washed in place with the vacuum still on. The cake is then scraped from the belt by a blade. Although no data was taken, discussions with a supplier of belt filter equipment revealed that belt filtration is not suitable for small particle zeolites. More particularly, the supplier noted that the cake resistance, even for thin cakes, is too high for the low pressure drop across the belt and that the thin cake would be difficult to remove from the belt.

EXAMPLE 4

A laboratory demonstration of conventional centrifugation of small particle (0.3–0.5 micron) zeolite was performed. A 12" basket centrifuge (a centrifuge with a perforated side covered by a filter media) was used to drive wash water through a cake of small particle zeolite. A first test with 3 to 5 microns pore size polypropylene cloth resulted in zeolite particles blowing through the pores. Even at low rpm settings the slurry penetrated the cloth and no cake was formed. A one micron pore size cloth was then used and cake formation took place. This centrifuge required large quantities of slurry, so a different, smaller centrifuge was used for subsequent tests.

A pair of polycarbonate "funnels" were made to fit inside a lab bottle centrifuge. A one micron filter cloth was placed at the "neck" of the funnel and about 200 ml of slurry placed on top of the cloth in the funnel "body"; this provided a small circular area of filter cloth and simulated a basket centrifuge. A zeolite cake was recovered. Washing was done by filling the funnel with wash water (without disturbing the cake) and restarting the centrifuge. Thus, washing could be done on a semi-continuous basis.

Washing times in the centrifuge were very long. Removal of the mother liquor required as long as three hours at 800 g's. These long wash times are due to the cake's compressibility at high g-forces. That is, the higher the applied g-force, the more compact and resistant to liquid flow the cake becomes. Coagulants will probably be ineffective in a centrifuge except for initial cake formation; the g-forces in a centrifuge are more than sufficient to break the coagulated slurry into its components.

While tested on small particle zeolite L (which because of their small size are not amenable to conventional washing or filtration techniques), this invention is also applicable to other large particle zeolites for which conventional washing and filtration techniques are available. As noted before, with proper equipment selection, this invention may also be applied to large (greater than one micron) size zeolites as well; this is especially true if a more effective wash of such zeolites is desired. Thus, the present invention provides a process for recovering zeolite crystals with a zeolite pH in a preselected range by washing zeolite crystals in an aqueous liquid with a microfilter.

The preferred washing mode is to pump fresh deionized water into the slurry at the rate of permeate loss until the permeate exhibits a pH in a target range below about 11.0. Typically, about 2 gallons of wash water per pound of zeolite have to be pumped across the filter as permeate to reduce the pH of the permeate below the target range, as opposed to conventional pressure filter washes of at least 4–5 gallons per pound of zeolite.

The preferred wash liquid or fluid is simply water, and more preferably deionized water, to insure that no contaminants are added which could interfere with the performance of catalysts made subsequently with the zeolite. For zeolite L crystallized in the potassium form, potassium salts may be included to repress exchange of hydrogen ions for potassium ions in the zeolite L, which is believed deleterious to catalyst performance. Of course the pH of these solutions must be below the desired 9.4 to 10.0 zeolite pH to reduce the pH into the target range.

Although potassium zeolite L is an excellent substrate for reforming catalysts, good reforming catalysts may also be produced using zeolite L in which some potassium ions are exchanged for other cations. Suitable cations for zeolite L reforming catalyst substrates include barium, calcium, cerium, lithium, magnesium, sodium, strontium, and zinc. If it is desired to introduce an additional cation into the zeolite, a salt of that cation may be added to the slurry solution and the ion exchange accomplished simultaneously with washing. Alternatively, another convenient point in the processing sequence to accomplish the ion exchange is immediately after the zeolite L is washed to the target pH and before the final concentration step. A method for such ion exchange is disclosed in U.S. Pat. No. 4,547,472 to Van Nordstrand, which is incorporated herein by reference.

Many other variations and modifications may be made in the apparatus and techniques hereinbefore described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

TABLE B

| Sample # | Permeate ml | Gallons Permeate/ lb Zeolite | Wash H2O ml | Gallons Wash H2O lb/Zeolite | Permeate Analysis by ICPES ppm elements in permeate | | Permeate pH | Mode |
|---|---|---|---|---|---|---|---|---|
| | | | | | Al | Si | | |
| 1 | 258 | 0.19 | 0 | 0.00 | 0.38 | 20120 | 12.09 | Concentrate |
| 2 | 552 | 0.41 | 164 | 0.12 | NA | NA | 12.06 | Wash |
| 3 | 702 | 0.53 | 285 | 0.21 | 0.2 | 11610 | 11.93 | Wash |
| 4 | 902 | 0.68 | 668 | 0.50 | NA | NA | 11.80 | Wash |
| 5 | 1052 | 0.79 | 737 | 0.55 | 0.49 | 6120 | 11.72 | Wash |
| 6 | 1176 | 0.88 | 832 | 0.62 | NA | NA | 11.62 | Wash |
| 7 | 1437 | 1.08 | 1182 | 0.89 | 0.7 | 3152 | 11.50 | Wash |
| 8 | 1678 | 1.26 | 1322 | 0.99 | NA | NA | 11.43 | Wash |
| 9 | 1900 | 1.42 | 1542 | 1.16 | 1.3 | 1499 | 11.31 | Wash |
| 10 | 2109 | 1.58 | 1762 | 1.32 | NA | NA | 11.30 | Wash |
| 11 | 2347 | 1.76 | 1982 | 1.48 | 0.7 | 693 | 11.30 | Wash |
| 12 | 2587 | 1.94 | 2202 | 1.65 | NA | NA | 11.24 | Wash |
| 13 | 2827 | 2.12 | 2557 | 1.92 | 1.2 | 314 | 11.24 | Wash |
| 14 | 3067 | 2.30 | 2797 | 2.10 | NA | NA | 11.21 | Wash |
| 15 | 3411.5 | 2.56 | 2857 | 2.14 | 0.48 | 243 | 11.10 | Concentrate |

Final slurry pH = 10.91

TABLE C

Initial Slurry 1000 ml of slurry
21.06 wt % solids (including zeolite)     161.5 g zeolite in slurry
14.02 wt % zeolite                         81.1 g silicates in slurry
                                          242.6 g total solids Recovery and Solids Material Balance

| | | | |
|---|---|---|---|
| 441 g 1st concentration permeate | 7.28 wt % solids | 32.1 grams solids |
| 2475 g washing step permeate | 1.2 wt % solids | 29.7 grams solids |
| 280 g second concentration permeate | 0.21 wt % solids | 0.6 grams solids |
| 356 g slurry recovered | 42.54 wt % solids | 151.4 grams solids |
| 910 g slurry wash-out recovered | 0.45 wt % solids | 4.1 grams solids |
| 823 g slurry wash-out recovered | 0.9 wt % solids | 7.4 grams solids |
| 17 g washed slurry (sample) | 22.27 wt % solids | 3.8 grams solids |
| 18 g 1st concentrated slurry (sample) | 27.63 wt % solids | 5.0 grams solids |

Total solids recovery        234.1 grams
Solids material balance      96.49 wt %

What is claimed is:

1. A process for washing zeolite crystals comprising circulating a mixture comprising a slurry of said crystals and an aqueous liquid through a porous microfilter device having a pore size of up to 1 micron and removing permeate from said microfilter device while maintaining said microfilter device free of buildup of a cake of said crystals, said washing conducted for a period of time sufficient to lower the pH of said zeolite.

2. The process of claim 1 wherein said zeolite pH is lowered to below about 11.0.

3. The process of claim 2 wherein said slurry is concentrated and washed to further reduce the zeolite pH to the range of about 9.4 to about 10.0.

4. The process of claim 1 wherein the zeolite crystals are less than 1 micron in size and the pore size of said microfilter is less than the size of said crystals.

5. The process of claim 1 wherein said lowered pH is from 9.4 to 10.0.

6. The process of claim 1 including the steps:
(a) circulating an aqueous slurry of the zeolite crystals and an aqueous liquid through said microfilter while removing permeate to initially concentrate the slurry prior to said washing;
(b) carrying out said washing by adding makeup aqueous liquid;
(c) further concentrating the aqueous slurry after the washing step to a final concentration by removing permeate without adding makeup liquid; and
(d) drying the concentrated slurry to remove residual liquids.

7. The process of claim 6, further comprising, separating zeolite crystals from supernatant mother liquor before circulating the zeolite slurry in said microfilter.

8. The process of claim 6, wherein step (a) further comprises, concentrating the aqueous initial concentration functionally related to a maximum operative pressure of said microfilter before beginning the washing step.

9. The process of claim 6, wherein the initial concentration is about 15 to about 40 weight percent of zeolite crystals in the slurry.

10. The process of claim 6, further comprising, ion exchanging the aqueous slurry at said final concentration with a suitable cation comprising a mon-, di, or trivalent metal cation from Groups I, II, or III of the Periodic Table, followed by reconcentrating the slurry to said final concentration.

11. The process of claim 6, wherein the final concentration is at least 40 weight percent of zeolite crystals in the slurry.

12. The process of claim 6, wherein the circulating is carried out at a flow rate of from 10 to 60 L/min per $m^2$ of filter entry area.

13. The process of claim 7, wherein the aqueous liquid is selected from water, deionized water, potassium solutions, or mixtures thereof.

14. The process of claim 13, wherein the aqueous liquid is deionized water containing a suitable cation for ion exchange comprising a mono-, di-, or trivalent metal cation from Group I, II, or III of the Periodic Table.

15. The process of claim 14, wherein the cation comprises barium, calcium, cerium, lithium, magnesium, sodium, strontium, zinc, or mixtures thereof.

16. The process of claim 1, wherein said microfilter has a pore size of from 0.01 to 1 micron.

17. The process of claim 16, wherein said microfilter comprises a media comprising polysulfone, cellulose acetate, sintered metal, ceramics, or combinations thereof.

18. The process of claim 1, wherein said zeolite crystals are less than 0.5 micron in size.

19. The process of claim 1 including the steps:

(a) circulating an aqueous slurry of said zeolite crystals and an aqueous fluid through a microfilter having a pore size of up to 1 micron at a preselected range of flow rates;

(b) concentrating the aqueous slurry to an initial concentration functionally related to operating characteristics of said microfilter by removing permeate from the slurry without adding makeup liquid;

(c) washing said zeolite crystals by adding aqueous liquid to the aqueous slurry to dilute the slurry;

(d) concentrating the aqueous slurry to a final concentration functionally related to operating characteristics of said microfilter by removing permeate without adding makeup liquid; and then (e) alternately adding aqueous liquid to dilute the slurry followed by concentrating the slurry until the zeolite pH is in the range of from 9.4 to 10.

20. The process of claim 1, further comprising, adding aqueous liquid to said zeolite crystals to form a pumpable aqueous slurry.

21. The process of claim 1 wherein the zeolite is zeolite L.

* * * * *